(12) United States Patent
Jackson (10) Patent No.: US 11,993,144 B2
(45) Date of Patent: May 28, 2024

(54) MOUNTING SYSTEM FOR MACHINE

(71) Applicant: Caterpillar Inc., Peoria, IL (US)

(72) Inventor: Robert Alan Jackson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 17/657,647

(22) Filed: Apr. 1, 2022

(65) Prior Publication Data

US 2023/0311643 A1   Oct. 5, 2023

(51) Int. Cl.
| | |
|---|---|
| *B60K 15/07* | (2006.01) |
| *B60K 15/03* | (2006.01) |
| *B60K 15/063* | (2006.01) |
| *E02F 9/08* | (2006.01) |

(52) U.S. Cl.
CPC .... *B60K 15/07* (2013.01); *B60K 2015/03118* (2013.01); *B60K 2015/03315* (2013.01); *B60K 2015/0639* (2013.01); *E02F 9/0883* (2013.01)

(58) Field of Classification Search
CPC .......... B60K 15/07; B60K 2015/03118; B60K 2015/03315; B60K 2015/0639; E02F 9/0883
USPC ....................................................... 248/200
See application file for complete search history.

(56) References Cited

U.S. PATENT DOCUMENTS

2015/0123393 A1    5/2015  Jackson et al.

FOREIGN PATENT DOCUMENTS

| JP | 2000127861 A | * | 5/2000 |
| JP | 2002528321 A | * | 9/2002 |
| JP | 2003025858 A | * | 1/2003 |
| JP | 6850758 | | 3/2021 |
| WO | 2018234810 | | 12/2018 |

OTHER PUBLICATIONS

JP2003025858A (Koji, Takano) (Jan. 29, 2003) (Machine Translation) (Year: 2003).*

* cited by examiner

*Primary Examiner* — Mahmoud Gimie (57) ABSTRACT

A mounting system for a machine includes a tank support structure adapted to mount tanks proximate to an operator cabin of the machine, a first mounting bracket fixedly coupled to the tank support structure, and a second mounting bracket adapted to be removably coupled to the first mounting bracket. The tank support structure defines a hollow space. The tanks are received within the hollow space. The tank support structure includes a first surface and a second surface spaced apart from the first surface. The hollow space is defined between the first surface and the second surface. The first surface is configured to be coupled to a portion of the machine for mounting the tank support structure on the machine. The first mounting bracket and the second mounting bracket are adapted to receive a section of the tanks for retaining the tanks within the tank support structure.

20 Claims, 8 Drawing Sheets

MOUNTING SYSTEM FOR MACHINE

TECHNICAL FIELD

The present disclosure relates to a mounting system for mounting one or more tanks on a machine.

BACKGROUND

A machine, such as a track type tractor, may be used in various work operations, such as, excavation, digging, moving, placement, compacting, levelling, dozing, grading, and hauling. Typically, such machines run on conventional fuel sources, such as, petrol and diesel. Burning of such conventional fuel sources may cause the machine to release harmful emissions into the atmosphere, which is not desirable. Further, such conventional fuel sources may be expensive.

To address the shortcomings of conventional fuel sources, the machine may utilize alternative fuel sources, such as, compressed natural gases for minimizing the harmful emissions into the atmosphere. The compressed natural gas may include, for example, hydrogen gas. However, the compressed natural gas may have a low energy density due to which a large amount of the compressed natural gas may have to be carried by the machine in order to operate the machine for a longer time. Generally, the compressed natural gas may be stored in storage tanks that are mounted on the machine. For example, the storage tanks may be coupled to a chassis of the machine. However, due to space constraints, only few storage tanks may be mounted on the chassis. Moreover, conventional mounting techniques that are used to mount the storage tanks on the machine may not be durable and robust.

WO2018234810A1 describes an off-road vehicle and/or work vehicle that includes but not limited to backhoe loader, excavator utilizing compressed natural gas or gasoline or diesel or petroleum fuel or any combination thereof. A cabin is placed on the chassis of the backhoe loader. A first support bracket is placed on the roof. An upper storage tank is placed on the first support bracket. A lower storage tank is attached to a second support bracket that is further coupled to the chassis. The gas from the upper storage tank and the lower storage tank goes to the engine through a common rail supply pipe. The gas is being filled into storage tank through the system of gas filling valve.

SUMMARY OF THE DISCLOSURE

In an aspect of the present disclosure, a mounting system for a machine is provided. The mounting system includes a tank support structure adapted to mount one or more tanks proximate to an operator cabin of the machine. The tank support structure defines a hollow space. The one or more tanks are received within the hollow space. The tank support structure includes a first surface and a second surface spaced apart from the first surface. The hollow space is defined between the first surface and the second surface. The first surface is configured to be coupled to a portion of the machine for mounting the tank support structure on the machine. The mounting system also includes at least one first mounting bracket fixedly coupled to the tank support structure. The mounting system further includes at least one second mounting bracket adapted to be removably coupled to the at least one first mounting bracket. The at least one first mounting bracket and the at least one second mounting bracket are adapted to receive a section of the one or more tanks for retaining the one or more tanks within the tank support structure.

In another aspect of the present disclosure, a machine is provided. The machine includes an operator cabin. The machine also includes a sweeps assembly extending over the operator cabin. The machine further includes a tank assembly coupled to the sweeps assembly. The tank assembly includes one or more tanks. The tank assembly also includes a mounting system adapted to receive the one or more tanks. The mounting system includes a tank support structure adapted to mount the one or more tanks proximate to the operator cabin of the machine. The tank support structure defines a hollow space. The one or more tanks are received within the hollow space. The tank support structure includes a first surface and a second surface spaced apart from the first surface. The hollow space is defined between the first surface and the second surface. The first surface is configured to be coupled to a portion of the machine for mounting the tank support structure on the machine. The mounting system also includes at least one first mounting bracket fixedly coupled to the tank support structure. The mounting system further includes at least one second mounting bracket adapted to be removably coupled to the at least one first mounting bracket. The at least one first mounting bracket and the at least one second mounting bracket are adapted to receive a section of the one or more tanks for retaining the one or more tanks within the tank support structure.

In another aspect of the present disclosure, a machine is provided. The machine includes an operator cabin. The machine also includes a sweeps assembly extending over the operator cabin. The machine further includes a tank assembly coupled to the sweeps assembly. The tank assembly includes a tank support structure adapted to receive one or more tanks. The tank assembly also includes one or more coupling arrangements adapted to couple the tank support structure with the sweeps assembly. The one or more coupling arrangements include a boss disposed between the tank support structure and the sweeps assembly. A pin of the boss is coupled to and at least partially received within a tube of the tank support structure. Further, a body of the boss has a load face in contact with a sweeps tube of the sweeps assembly. The one or more coupling arrangements include also includes a fastening member adapted to couple with each of the sweeps assembly and the boss for coupling the tank support structure with the sweeps assembly. The fastening member is coupled to and at least partially received within each of the sweeps tube of the sweeps assembly and the body of the boss.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
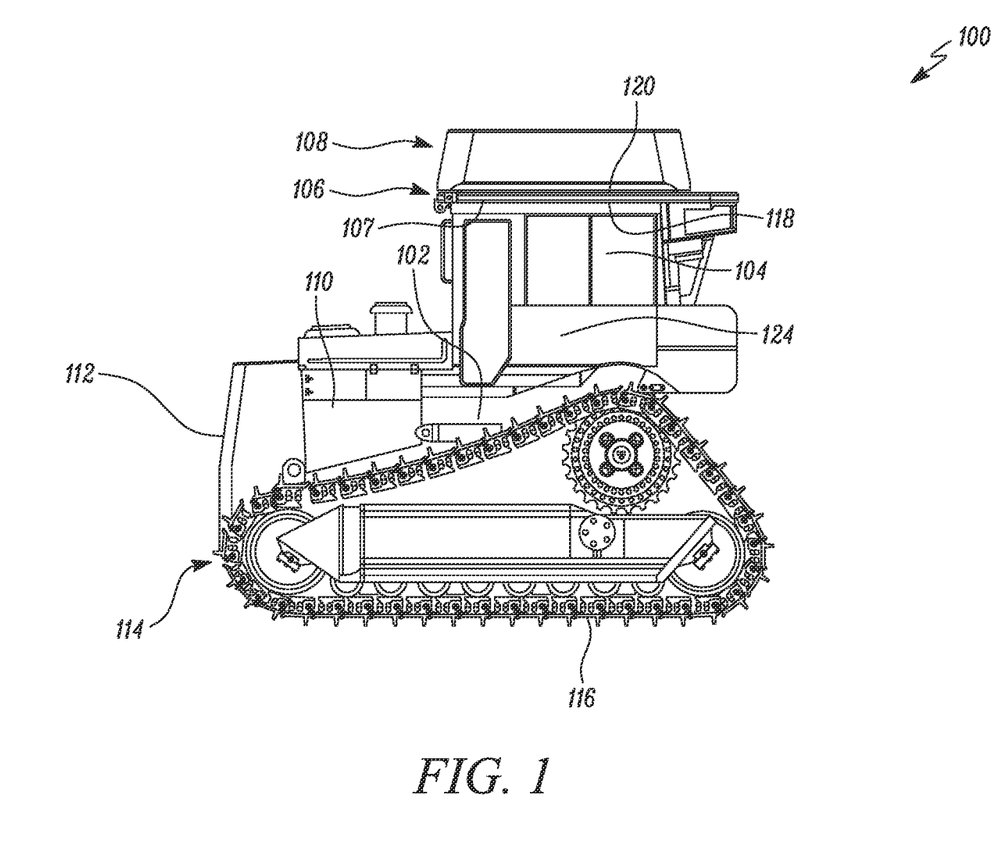
FIG. 1 is a side view of a machine, according to an embodiment of the present disclosure.

Referring to FIG. 1, a schematic side view of a machine 100 is illustrated, according to an embodiment of the present disclosure. In the illustrated embodiment of FIG. 1, the machine 100 is a track type tractor. In alternative embodiments, the machine 100 may include an excavator, a dozer, a harvester, or any other type of machine known in the art. The machine 100 may perform one or more machine operations associated with an industry, such as, mining, construction, farming, transportation, or any other industry known in the art. The machine 100 may be embodied as a manual, an autonomous, or a semi-autonomous machine, without any limitations.

The machine 100 includes a frame 102. The frame 102 may support various machine components thereon. The machine 100 also includes an operator cabin 104. The operator cabin 104 is mounted on the frame 102. When the machine 100 is embodied as a manual or a semi-autonomous machine, an operator of the machine 100 may be seated within the operator cabin 104 to perform one or more machine operations.

Figure 4:
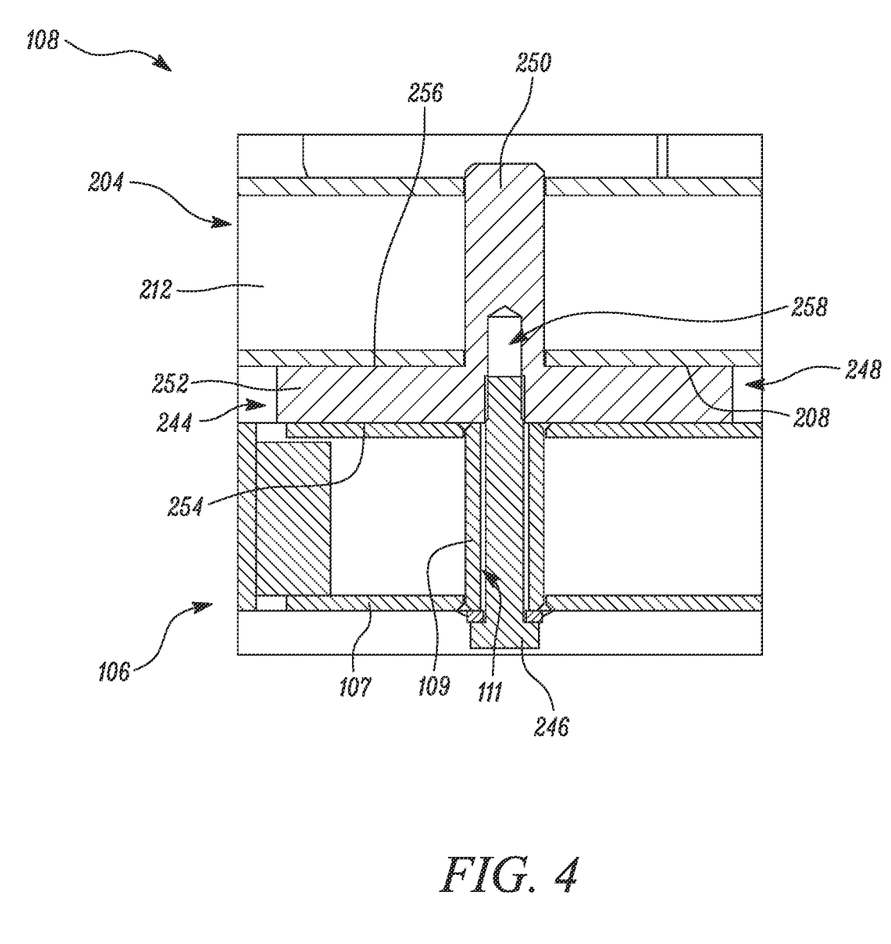
FIG. 4 is a cross-sectional view of a portion of the tank support structure coupled to a sweeps assembly of the machine.

Further, the machine 100 includes a sweeps assembly 106 extending over the operator cabin 104. The sweeps assembly 106 defines an underside surface 118 facing the operator cabin 104, and an upper surface 120 disposed opposite the underside surface 118. In the illustrated embodiment of FIG. 1, the sweeps assembly 106 is coupled to the operator cabin 104. The sweeps assembly 106 may be coupled to the operator cabin 104 using one or more isolation mounts (not shown). Further, the sweeps assembly 106 may include a pair of sweeps tube 107 (only one of which is illustrated herein). In some examples, each sweeps tube 107 may receive a pair of compression sleeves 109 (one of which is shown in FIG. 4). Further, each compression sleeve 109 may define a through-aperture 111 (shown in FIG. 4).

The machine 100 may also include one or more work implements (not shown), such as, a bucket, a blade, a ripper, and the like. The work implement may be supported by the frame 102. The machine 100 also includes a power source (not shown) that generates output power. The power source may be an engine, such as, an internal combustion engine (for e.g., a compression ignition diesel engine), a gas turbine engine, and the like. The engine may generate the output power based on a supply of compressed natural gas, such as, hydrogen gas. The power source may be mounted on the frame 102. The power source may be received within an enclosure 110. The machine 100 also includes a radiator (not shown), and a radiator guard 112.

Further, the frame 102 supports an undercarriage system 114. The undercarriage system 114 includes a pair of ground engaging members 116 each of which is embodied as a track herein. The ground engaging members 116 rotate in order to propel the machine 100 on ground surfaces. In other examples, the machine 100 may include wheels instead of the tracks. The machine 100 further includes one or more fenders 124 disposed at either sides of the machine 100. The fenders 124 may be positioned adjacent to the operator cabin 104. Although not shown herein, the machine 100 may include various other components, without any limitations.

The machine 100 further includes a tank assembly 108 coupled to the sweeps assembly 106. In the illustrated embodiment of FIG. 1, the tank assembly 108 is mounted on a roof of the operator cabin 104. The tank assembly 108 includes a tank support structure 204 (shown in FIGS. 2A and 2B). The tank support structure 204 is removably coupled to the sweeps assembly 106. Further, the tank support structure 204 may be coupled to the underside surface 118 or the upper surface 120 of the sweeps assembly 106. In the illustrated embodiment of FIG. 1, the tank support structure 204 is coupled to the upper surface 120 of the sweeps assembly 106. In some examples, the machine 100 may include more than one tank assembly 108, without any limitations.

Figure 2A:
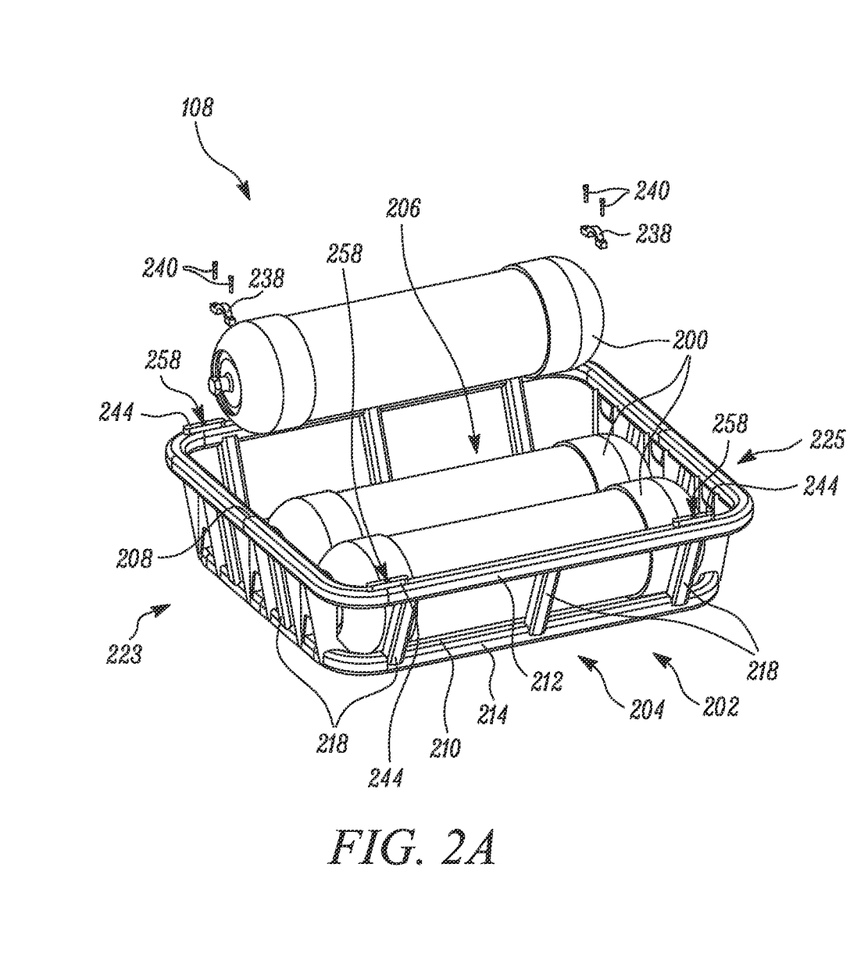
FIG. 2A illustrates a tank assembly associated with the machine of FIG. 1, according to an embodiment of the present disclosure.

Referring now to FIG. 2A, the tank assembly 108 includes one or more tanks 200. The one or more tanks 200 may be a hydrogen tank. Hydrogen gas stored in the tanks 200 may be used as a fuel source for operating the power source of the machine 100 (see FIG. 1). However, it should be noted that the one or more tanks 200 may be used to store any other type of gas in a liquified form, without any limitations. Further, the tank assembly 108 includes a mounting system 202. The mounting system 202 receives the one or more tanks 200. Specifically, the mounting system 202 includes the tank support structure 204 for mount the one or more tanks 200 proximate to the operator cabin 104 (see FIG. 1) of the machine 100.

As shown in FIG. 2A, the tank support structure 204 defines a hollow space 206. The one or more tanks 200 are received within the hollow space 206. The tank support structure 204 includes a first surface 208 and a second surface 210 spaced apart from the first surface 208. The hollow space 206 is defined between the first surface 208 and the second surface 210. The first surface 208 is coupled to a portion of the machine 100 for mounting the tank support structure 204 on the machine 100. In the present disclosure, the portion of the machine 100 includes the sweeps assembly 106 (see FIG. 1). Further, the first surface 208 of the tank support structure 204 faces the sweeps assembly 106 when the tank support structure 204 is coupled to the sweeps assembly 106. Furthermore, the tank support structure 204 includes a first tube 212 defining the first surface 208. The first tube 212 may be hereinafter interchangeably referred to as "the tube" 212. The tank support structure 204 also includes a second tube 214 spaced apart from the first tube 212. The first and second tubes 212, 214 have a substantially rectangular shape.

Figure 2B:
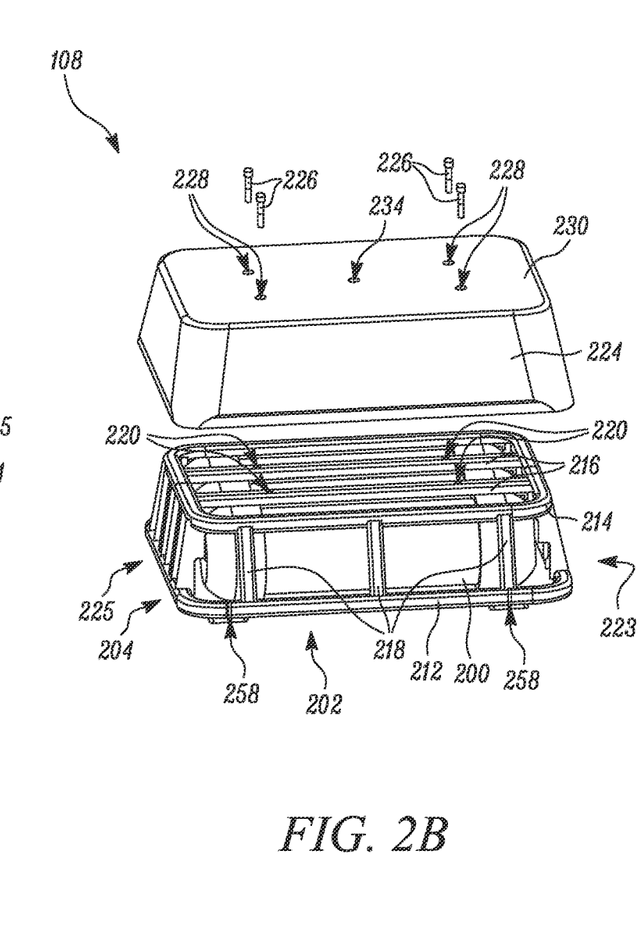
FIG. 2B is an exploded view of a cover and a tank support structure of the tank assembly of FIG. 2A.

As illustrated in FIG. 2B, the tank support structure 204 includes a number of first bars 216 connected to the second tube 214. Further, the number of first bars 216 and the second tube 214 define the second surface 210. The tank support structure 204 includes two first bars 216 herein. Alternatively, a total number of the first bars 216 may vary, as per application requirements. Each first bar 216 defines a number of first through-holes 220. In the illustrated embodiment of FIG. 2B, each first bar 216 defines two first through-holes 220. Alternatively, a total number of the first through-holes 220 in each first bar 216 may vary, as per application requirements.

Further, the tank support structure 204 includes a number of second bars 218 extending between the first tube 212 and the second tube 214. The second bars 218 are fixedly connected to the first tube 212 and the second tube 214. Moreover, the tank support structure 204 includes one or more pairs of vertical bars 237 (shown in FIGS. 3A and 3B). The pairs of verticals bars 237 are fixedly coupled to and extend between the first tube 212 and the second tube 214. Further, each pair of vertical bars 237 are disposed between two second bars 218. In some examples, one or more sensors, wiring, pressure lines may also be disposed in the tank support structure 204.

The mounting system 202 further includes a cover 224 removably coupled to the tank support structure 204. The cover 224 encloses the tank support structure 204. The cover 224 is removably coupled to the tank support structure 204 by a number of first fastening devices 226. Specifically, the cover 224 defines a number of third through-holes 228 extending from a top surface 230 of the cover 224. In the illustrated embodiment of FIG. 2B, the cover 224 includes four third through-holes 228. Alternatively, a total number of the third through-holes 228 may vary, as per application requirements. The third through-holes 228 in the cover 224 align with the first through-holes 220 in the first bars 216 for receiving a corresponding first fastening device 226. The first fastening devices 226 may include bolts, screws, pins, dowels, and the like. The first fastening devices 226 may retain the cover 224 in a fixed position relative to the tank support structure 204. Additionally, the first fastening devices 226 may be used for lifting the cover 224 by gripping of the first fastening devices 226. In such examples, the first fastening device 226 may embody lifting bolts. In some examples, the cover 224 may include one or more through-holes defined along a periphery of the cover 224 for receiving additional fastening devices, similar to the first fastening devices 226, for coupling of the cover 224 with the tank support structure 204.

The cover 224 further includes a port 234 extending from a center of the top surface 230 of the cover 224. The port 234 may define an air flow path. In some examples, a leak detection sensor may be disposed in the port 234 for detecting leakage of gases from the tanks 200. Further, the cover 224 and the tank support structure 204 may be made from a metallic material or a non-metallic material. In some examples, the cover 224 and the tank support structure 204 may be made of the same material. In other examples, the cover 224 and the tank support structure 204 may be made of different materials.

Figure 3A:
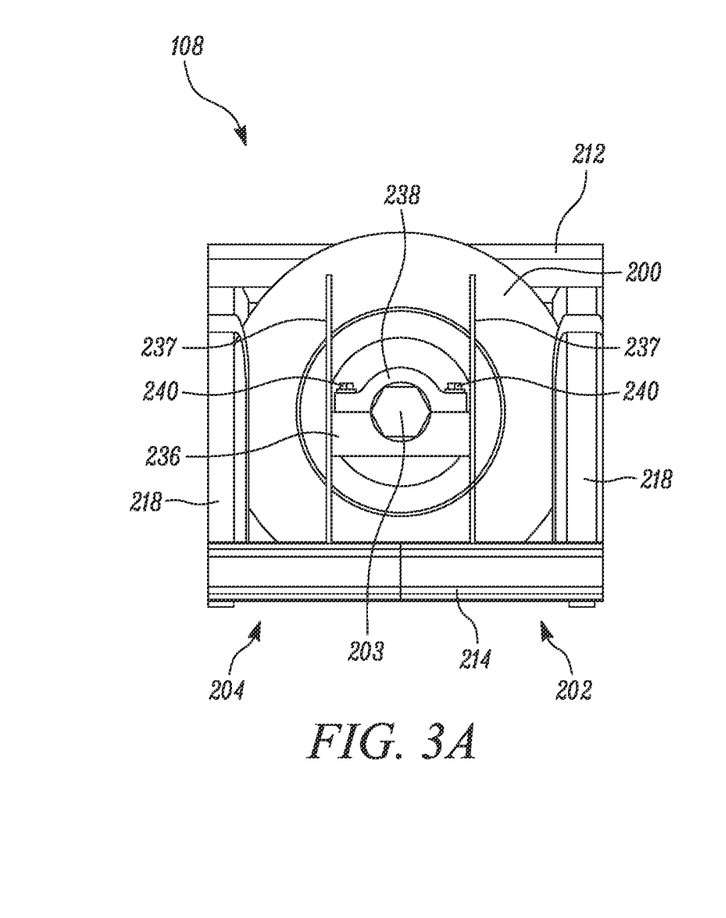
FIGS. 3A and 3B are schematic side views of a portion of a tank coupled to the tank support structure of FIG. 2B.

As illustrated in FIG. 3A, the mounting system 202 includes one or more first mounting brackets 236 fixedly coupled to the tank support structure 204. The one or more first mounting brackets 236 are fixedly coupled to the first tube 212 and the second tube 214. Further, the one or more first mounting brackets 236 are disposed between two of the number of second bars 218. The first mounting brackets 236 are fixedly coupled to and extend between the pair of vertical bars 237. The mounting system 202 also includes one or more second mounting brackets 238 removably coupled to the one or more first mounting brackets 236.

Further, the one or more first mounting brackets 236 and the one or more second mounting brackets 238 receive a section 203 of the one or more tanks 200 for retaining the one or more tanks 200 within the tank support structure 204. In some examples, the section 203 of the one or more tanks 200 may include a valve of the one or more tanks 200. The first and second mounting brackets 236, 238 may include a design that may allow secure retention of the section 203 therebetween. For example, each of the first and second mounting brackets 236, 238 may include a semi-circular portion that confirms with a circular shape of the section 203. In the illustrated embodiment of FIG. 3A, the second mounting bracket 238 is removably coupled to the first mounting bracket 236 by a number of second fastening devices 240. Specifically, the second mounting bracket 238 is removably coupled to the first mounting bracket 236 by two second fastening devices 240. The second fastening devices 240 may include bolts, screws, pins, dowels, and the like, without any limitations.

It should be noted that each tank 200 is coupled to the tank support structure 204 at each of a first side 223 of the tank support structure 204 and a second side 225 of the tank support structure 204 by a corresponding first mounting bracket 236, a corresponding second mounting bracket 238, and two corresponding second fastening devices 240. Thus, a total number of the first mounting brackets 236, the second mounting brackets 238, and the second fastening devices 240 may be dependent on a total number of the tanks 200 associated with the tank assembly 108.

Figure 3B:
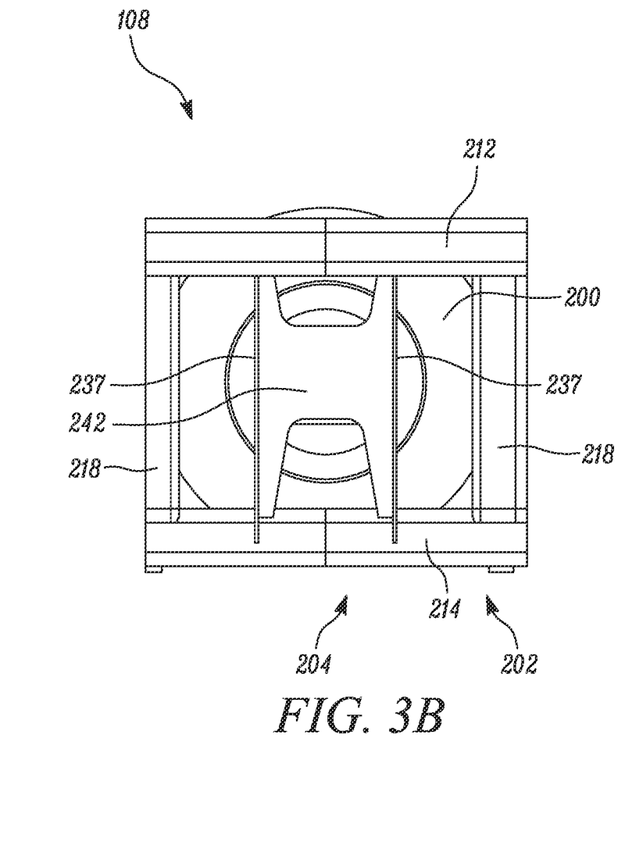

As shown in FIG. 3B, the mounting system 202 further includes a number of gusset plates 242. Each gusset plate 242 may be fixedly coupled to the pair of vertical bars 237. Each gusset plate 242 may cover the valve of a corresponding tank 200. It should be noted that the details provided herein in regard to the coupling of the tanks 200 with the tank support structure 204 is exemplary in nature, and the mounting system 202 may include any other arrangement of components to facilitate the coupling of the tanks 200 with the tank support structure 204. For example, the tanks 200 may additionally, or alternatively, include harnesses for coupling the tanks 200 with the tank support structure 204.

Referring to FIG. 4, a cross-sectional view of a portion of the tank support structure 204 coupled to the sweeps assembly 106 is illustrated. The tank support structure 204 is removably coupled to the sweeps assembly 106 by one or more bosses 244 and one or more fastening members 246. More particularly, the tank assembly 108 includes one or more coupling arrangements 248 that couple the tank support structure 204 with the sweeps assembly 106. In some examples, the tank assembly 108 may include four coupling arrangements 248 for coupling the tank support structure 204 with the sweeps assembly 106. More particularly, two of the coupling arrangements 248 may be disposed at the first side 223 (see FIG. 2A) of the tank support structure 204 and two of the coupling arrangements 248 may be disposed at the second side 225 (see FIG. 2A) of the tank support structure 204. Alternatively, more than two coupling arrangements 248 or only one coupling arrangement 248 may be disposed at each of the first and second sides 223, 225, based on a size of the tank support structure 204.

The one or more coupling arrangements 248 include the boss 244 disposed between the tank support structure 204 and the sweeps assembly 106. The boss 244 includes a pin 250. The pin 250 of the boss 244 is coupled to and at least partially received within the tube 212 of the tank support structure 204. Further, the boss 244 includes a body 252. The body 252 of the boss 244 has a load face 254 that contacts with the sweeps tube 107 of the sweeps assembly 106. Further, the body 252 also has a load face 256 that contacts with the first surface 208 of the tube 212. The pin 250 and the body 252 together define an aperture 258.

The one or more coupling arrangements 248 also include the fastening member 246 that couples with each of the sweeps tube 107 of the sweeps assembly 106 and the boss 244 for coupling the tank support structure 204 with the sweeps assembly 106. The fastening member 246 is coupled to and at least partially received within each of the sweeps tube 107 of the sweeps assembly 106 and the body 252 of the boss 244. More particularly, the through-aperture 111 defined by the compression sleeve 109 aligns with the aperture 258 for receiving a corresponding fastening member 246 for coupling the tank support structure 204 with the sweeps assembly 106. The fastening members 246 may include bolts, pin, screws, dowels, and the like. It should be noted that the details provided herein in regard to the coupling of the tank support structure 204 with the sweeps assembly 106 is exemplary in nature. Further, any other arrangement of components may be used to facilitate the coupling of the tank support structure 204 with the sweeps assembly 106.

Figure 5:
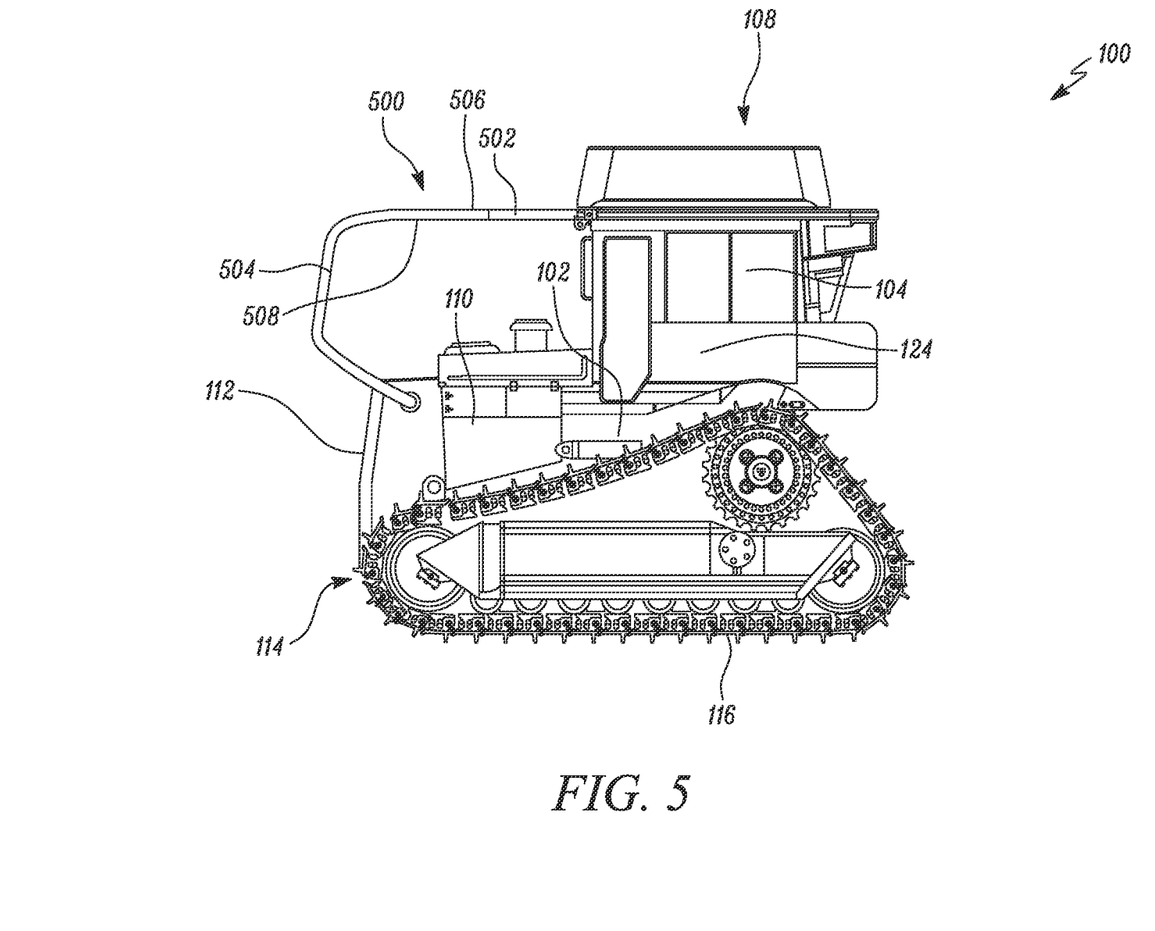
FIG. 5 is a schematic side view of the machine having a sweeps assembly, according to another embodiment of the present disclosure.

Referring to FIG. 5, a schematic side view of the machine 100 is illustrated, according to another embodiment of the present disclosure. In the illustrated embodiment of FIG. 5, the machine 100 includes a sweeps assembly 500. The sweeps assembly 500 is substantially similar to the sweeps assembly 106 (illustrated and explained in reference to FIG. 1), in terms of functionality. However, the sweeps assembly 500 is coupled to the operator cabin 104 and the radiator guard 112 of the machine 100.

As illustrated in FIG. 5, the sweeps assembly 500 includes a pair of first sweeps tube 502 (only one of which is illustrated herein) and a pair of second sweeps tube 504 (only one of which is illustrated herein) extending from a corresponding first sweeps tube 502. The pair of first sweeps tube 502 may be coupled to the operator cabin 104 using one or more isolation mounts (not shown). Further, the pair of second sweeps tubes 504 may be coupled to the radiator guard 112 using one or more isolation mounts (not shown). Furthermore, in the illustrated embodiment of FIG. 5, the tank assembly 108 is coupled to an upper surface 506 of the sweeps assembly 500. The tank assembly 108 may be coupled to the sweeps assembly 500 using a coupling arrangement. The coupling arrangement may be substantially similar to the coupling arrangement 248 explained in reference to FIG. 4.

Figure 6:
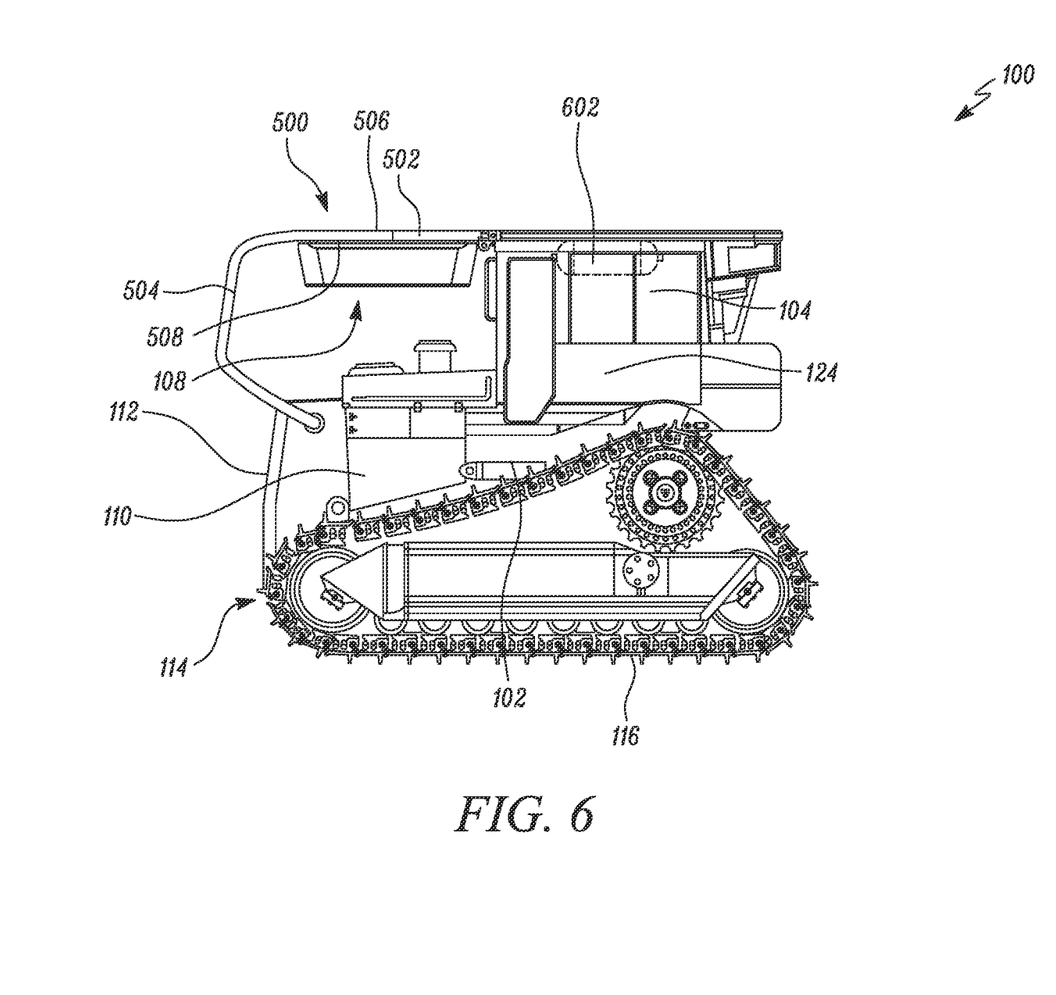
FIG. 6 is a schematic side view of the machine illustrating the tank assembly connected to an underside surface of the sweeps assembly of FIG. 5, according to yet another embodiment of the present disclosure.

FIG. 6 illustrates an alternate embodiment of the present disclosure. In the illustrated embodiment of FIG. 6, the tank assembly 108 is coupled to an underside surface 508 of the sweeps assembly 500. More particularly, the tank assembly 108 is disposed in front of the operator cabin 104. In some examples, the machine 100 may include two tank assemblies similar to the tank assembly 108. For example, one tank assembly 108 may be coupled to the upper surface 506 and another tank assembly 108 may be coupled to the underside surface 508. Further, in some examples, one or more tanks 602 (shown with hidden lines), similar to the tanks 200 (see FIG. 2A), may also be coupled to the sweeps assembly 500. The tanks 602 may be disposed adjacent to the operator cabin 104. It should be noted that the tanks 602 may be received within a tank assembly (not shown herein) that may be substantially similar in design to the tank assembly 108, without any limitations. However, the tank assembly that holds each tank 602 may be compact in size for accommodating the tank assembly adjacent to the operator cabin 104.

Figure 7:
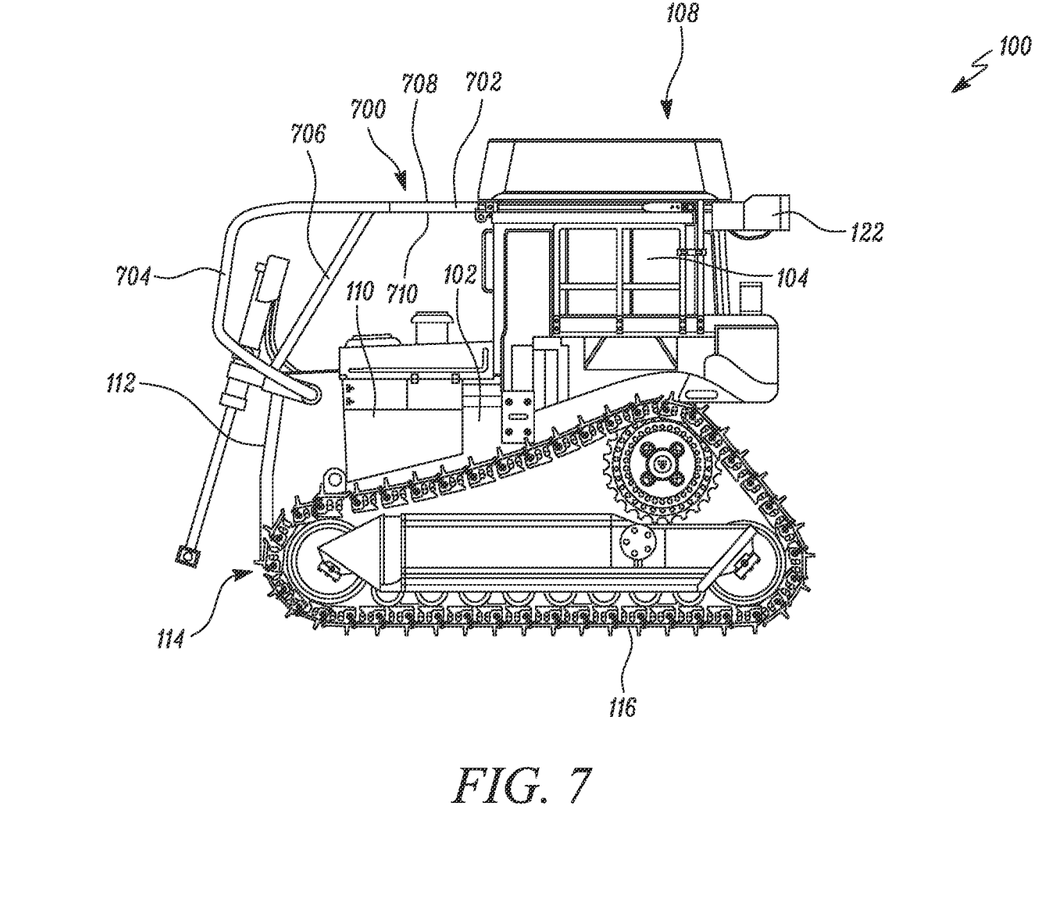
FIG. 7 is a schematic side view of the machine having a sweeps assembly, according to an embodiment of the present disclosure.

Referring now to FIG. 7, a schematic side view of the machine 100 is illustrated, according to yet another embodiment of the present disclosure. In the illustrated embodiment of FIG. 7, the machine 100 includes a roll over protection structure (ROPS) 122. The ROPS 122 may be disposed proximate to the operator cabin 104 of the machine 100. The ROPS 122 may include any structure that may prevent a toppling of the machine 100 during mobility or operation. As illustrated in FIG. 7, the machine 100 includes a sweeps assembly 700. The sweeps assembly 700 is substantially similar to the sweeps assembly 106 (illustrated and explained in reference to FIG. 1), in terms of functionality. However, the sweeps assembly 700 is coupled to the radiator guard 112 and the ROPS 122 of the machine 100.

The sweeps assembly 700 includes a pair of first sweeps tube 702 (only one of which is illustrated herein) and a pair of second sweeps tube 704 (only one of which is illustrated herein) extending from a corresponding first sweeps tube 702. Further, opposite ends of the second sweeps tubes 704 are connected to each other by a linear portion 706 to provide adequate support to the sweeps assembly 700. The pair of first sweeps tube 702 may be coupled to the ROPS 122 using mechanical fasteners (not shown), such as, bolts, screws, pins, dowels, and the like. Further, the pair of second sweeps tubes 704 may be coupled to the radiator guard 112 using one or more isolation mounts (not shown).

Further, in the illustrated embodiment of FIG. 7, the tank assembly 108 is coupled to an upper surface 708 of the sweeps assembly 700. The tank assembly 108 may be coupled to the sweeps assembly 700 using a coupling arrangement. The coupling arrangement may be substantially similar to the coupling arrangement 248 explained in reference to FIG. 4. Alternatively, the tank assembly 108 may be coupled to an underside surface 710 of the sweeps assembly 700. In some examples, the machine 100 may include two tank assemblies similar to the tank assembly 108. For example, one tank assembly 108 may be coupled to the upper surface 708 and another tank assembly 108 may be coupled to the underside surface 710.

Figure 8:
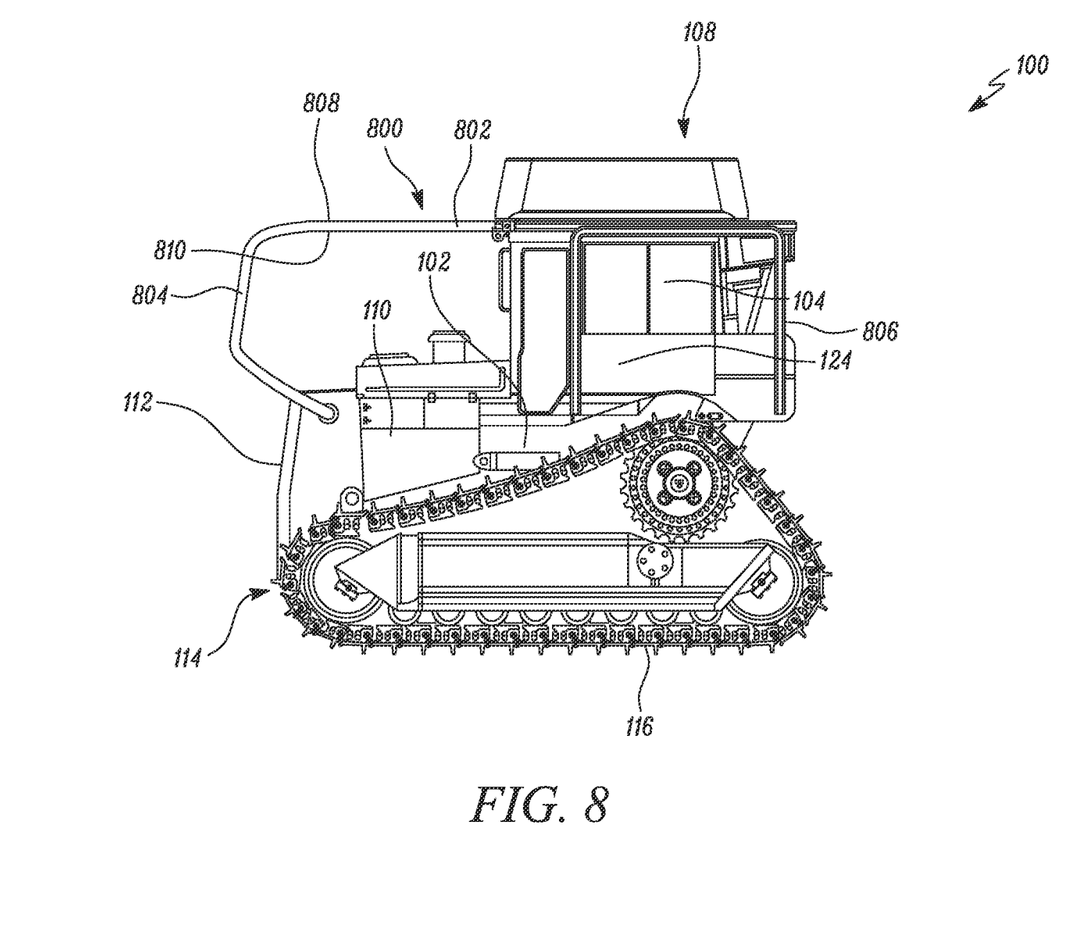
FIG. 8 is a schematic side view of the machine having a sweeps assembly, according to another embodiment of the present disclosure.

Referring now to FIG. 8, a schematic side view of the machine 100 is illustrated, according to yet another embodiment of the present disclosure. As illustrated in FIG. 8, the machine 100 includes a sweeps assembly 800. The sweeps assembly 800 is substantially similar to the sweeps assembly 106 (illustrated and explained in reference to FIG. 1), in terms of functionality. However, the sweeps assembly 800 is coupled to the radiator guard 112 and the fender 124 of the machine 100. As illustrated in FIG. 8, the sweeps assembly 800 includes a pair of first sweeps tube 802 (only one of which is illustrated herein) and a pair of second sweeps tube 804 (only one of which is illustrated herein) extending from one end of a corresponding first sweeps tube 802. The pair of second sweeps tube 804 may be coupled to the radiator guard 112 using one or more isolation mounts (not shown).

Further, the sweeps assembly 800 includes a pair of third sweeps tube 806 (only one of which is illustrated herein), each third sweeps tube 806 is coupled to and extends from a corresponding first sweeps tube 802. The third sweeps tube 806 includes a generally U-shaped design herein. Alternatively, the third sweeps tube 806 may have a different design. The third sweeps tube 806 is coupled to the fender 124 of the machine 100 that are disposed adjacent to the operator cabin 104. Further, each end of the pair of third sweeps tubes 806 may be coupled to the fender 124 using mechanical fasteners, such as, bolts, screws, pins, dowels, and the like. In the illustrated embodiment of FIG. 8, the sweeps assembly 800 is independent of the operator cabin 104. In other words, the sweeps assembly 800 is not coupled with the operator cabin 104. It should be noted that the details provided herein in regard to a design of the sweeps assembly 800 and the coupling of the sweeps assembly 800 with the fenders 124 and the radiator guard 112 is exemplary in nature. Accordingly, the sweeps assembly 800 may include any other design or means to couple the sweeps assembly 800 with the fenders 124 and the radiator guard 112.

In the illustrated embodiment of FIG. 8, the tank assembly 108 is coupled to an upper surface 808 of the sweeps assembly 800. Further, the tank assembly 108 may be coupled to the sweeps assembly 800 using a coupling arrangement. The coupling arrangement may be substantially similar to the coupling arrangement 248 explained in reference to FIG. 4. Alternatively, the tank assembly 108 may be coupled to an underside surface 810 of the sweeps assembly 800. In some examples, the machine 100 may include two tank assemblies similar to the tank assembly 108. For example, one tank assembly 108 may be coupled to the upper surface 808 and another tank assembly 108 may be coupled to the underside surface 810.

INDUSTRIAL APPLICABILITY

The tank assembly 108 described herein may provide a simple, robust and durable technique of mounting the tanks 200 on the operator cabin 104. The tank assembly 108 may be mounted on the roof of the operator cabin 104 that is typically not used for any other purposes, thereby increasing a gas storage capacity of the machine 100. Further, an increase in the gas storage capacity of the machine 100 may in turn improve a run time of the machine 100. The tank assembly 108 may also reduce a dependence of the machine 100 on conventional fuel sources, such as petrol or diesel, thereby reducing harmful emissions for the machine 100. Moreover, the tank assembly 108 may reduce an operating cost of the machine 100 by reducing a dependence on such conventional fuel sources.

The mounting system 202 of the tank assembly 108 may facilitate easy and quick mounting of the tanks 200 on the tank support structure 204. Moreover, the first and second mounting brackets 236, 238 of the mounting system 202 may provide a robust coupling of the tanks 200 with the tank support structure 204, thereby preventing movement of the tanks 200 within the tank support structure 204 or an unintentional removal of the tanks 200 from the tank support structure 204.

Further, the cover 224 described herein may guard the tank support structure 204 as well as the tanks 200 from damages due to collision with surrounding objects. Furthermore, the cover 224 may include features, such as the port 234, for accommodating sensors that may be used to detect gas leakage from the tanks 200. Moreover, the tank assembly 108 described herein may be retrofitted on existing machines that include the sweeps assembly 106, 500, 700, 800. Additionally, the tank assembly 108 may be coupled to various configurations of sweeps assemblies (such as, the sweeps assembly 106, 500, 700, 800).

The tank assembly 108 includes multiple coupling arrangements 248 that may allow easy and quick coupling of the tank support structure 204 with the sweeps assembly 106. Further, the boss 244 of each coupling arrangement 248 may prevent failure of the first tube 212 of the tank support structure 204 and the sweeps assembly 106. More particularly, the body 252 includes a large surface area defined by the load faces 254, 256 that may provide improved load distribution. Additionally, the compression sleeve 109 associated with the sweeps tube 107 may prevent failure of the sweeps tube 107, thereby improving an operating life of the sweeps assembly 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A mounting system for a machine comprising:
   a tank support structure adapted to mount one or more tanks proximate to an operator cabin of the machine, the tank support structure defining a hollow space, the one or more tanks being received within the hollow space, wherein the tank support structure includes a first surface and a second surface spaced apart from the first surface, wherein the hollow space is defined between the first surface and the second surface, and wherein the first surface is configured to be coupled to a portion of the machine for mounting the tank support structure on the machine;
   at least one first mounting bracket fixedly coupled to the tank support structure; and
   at least one second mounting bracket adapted to be removably coupled to the at least one first mounting bracket, wherein the at least one first mounting bracket and the at least one second mounting bracket are adapted to receive a valve of the one or more tanks for retaining the one or more tanks between the first mounting bracket and second mounting bracket within the tank support structure; and
   a sweeps assembly extending over the operator cabin, and being coupled to the operator cabin and a radiator guard of the machine.

2. The mounting system of claim 1, wherein the tank support structure further includes:
   a first tube defining the first surface;
   a second tube spaced apart from the first tube;
   a plurality of first bars connected to the second tube, wherein the plurality of first bars and the second tube define the second surface; and
   a plurality of second bars extending between the first tube and the second tube, wherein the at least one first mounting bracket is fixedly coupled to the first tube and the second tube, the at least one first mounting bracket being disposed between two of the plurality of second bars.

3. The mounting system of claim 1, wherein the tank support structure is removably coupled to the sweeps assembly by at least one boss and at least one fastening member, and wherein the first surface of the tank support structure faces the sweeps assembly when the tank support structure is coupled to the sweeps assembly.

4. The mounting system of claim 3, wherein the sweeps assembly defines an underside surface facing the operator cabin and an upper surface disposed opposite the underside surface, and wherein the tank support structure is coupled to the underside surface or the upper surface of the sweeps assembly.

5. The mounting system of claim 1, wherein the sweeps assembly is coupled to a roll over protection structure of the machine.

6. The mounting system of claim 1, wherein the sweeps assembly is coupled to a fender of the machine.

7. The mounting system of claim 1, further comprising a cover removably coupled to the tank support structure, wherein the cover encloses the tank support structure.

8. The mounting system of claim 1, wherein each of the one or more tanks is a hydrogen tank.

9. A machine comprising:
an operator cabin;
a sweeps assembly extending over the operator cabin, wherein the sweeps assembly is coupled to the operator cabin and a radiator guard of the machine; and
a tank assembly coupled to the sweeps assembly, the tank assembly including:
one or more tanks; and
a mounting system adapted to receive the one or more tanks, the mounting system including:
a tank support structure adapted to mount the one or more tanks proximate to the operator cabin of the machine, the tank support structure defining a hollow space, the one or more tanks being received within the hollow space, wherein the tank support structure includes a first surface and a second surface spaced apart from the first surface, wherein the hollow space is defined between the first surface and the second surface, and wherein the first surface is configured to be coupled to a portion of the machine for mounting the tank support structure on the machine;
at least one first mounting bracket fixedly coupled to the tank support structure; and
at least one second mounting bracket adapted to be removably coupled to the at least one first mounting bracket, wherein the at least one first mounting bracket and the at least one second mounting bracket are adapted to receive a section of the one or more tanks for retaining the one or more tanks within the tank support structure.

10. The machine of claim 9, wherein the tank support structure further includes:
a first tube defining the first surface;
a second tube spaced apart from the first tube;
a plurality of first bars connected to the second tube, wherein the plurality of first bars and the second tube define the second surface; and
a plurality of second bars extending between the first tube and the second tube, wherein the at least one first mounting bracket is fixedly coupled to the first tube and the second tube, the at least one first mounting bracket being disposed between two of the plurality of second bars.

11. The machine of claim 9, wherein the tank support structure is removably coupled to the sweeps assembly by at least one boss and at least one fastening member, and wherein the first surface of the tank support structure faces the sweeps assembly when the tank support structure is coupled to the sweeps assembly.

12. The machine of claim 9, wherein the sweeps assembly is coupled to a roll over protection structure of the machine.

13. The machine of claim 9, wherein the sweeps assembly is coupled to a fender of the machine.

14. The machine of claim 9, wherein the sweeps assembly defines an underside surface facing the operator cabin, and an upper surface disposed opposite the underside surface, and wherein the tank support structure is coupled to the underside surface or the upper surface of the sweeps assembly.

15. The machine of claim 9, wherein the mounting system further includes a cover removably coupled to the tank support structure, and wherein the cover encloses the tank support structure.

16. A machine comprising:
an operator cabin;
a sweeps assembly extending over the operator cabin; and
a tank assembly coupled to the sweeps assembly, the tank assembly including:
a tank support structure adapted to receive one or more tanks; and
one or more coupling arrangements adapted to couple the tank support structure with the sweeps assembly, wherein each of the one or more coupling arrangements includes: a boss disposed between the tank support structure and the sweeps assembly, a pin of the boss being coupled to and at least partially received within a tube of the tank support structure, a body of the boss having a load face being in contact with a sweeps tube of the sweeps assembly; and
a fastening member adapted to couple with each of the sweeps assembly and the boss for coupling the tank support structure with the sweeps assembly, the fastening member coupled to and at least partially received within each of the sweeps tube of the sweeps assembly and the body of the boss.

17. The machine of claim 16, wherein the sweeps assembly extends from the operator cabin to a forward frame portion of the machine forward along a direction of travel.

18. The machine of claim 16, wherein the sweeps assembly is coupled to and a roll over protection structure of the machine.

19. The machine of claim 16, wherein the sweeps assembly is coupled to a fender of the machine.

20. The machine of claim 16, wherein the mounting system further includes a cover removably coupled to the tank support structure, and wherein the cover encloses the tank support structure.

* * * * *